United States Patent
Wang et al.

(10) Patent No.: US 8,004,275 B2
(45) Date of Patent: Aug. 23, 2011

(54) POSITION SENSOR ARRANGEMENT AND METHOD

(75) Inventors: Orson S. Wang, Livonia, MI (US); John N. Stockbridge, Novi, MI (US); Jonathon K. Ho, Oshawa (CA)

(73) Assignee: GM Global Technology Operations LLC, Detroit, MI (US)

( * ) Notice: Subject to any disclaimer, the term of this patent is extended or adjusted under 35 U.S.C. 154(b) by 249 days.

(21) Appl. No.: 12/361,889

(22) Filed: Jan. 29, 2009

(65) Prior Publication Data

US 2009/0201013 A1 Aug. 13, 2009

Related U.S. Application Data

(60) Provisional application No. 61/026,818, filed on Feb. 7, 2008.

(51) Int. Cl.
*G01B 7/14* (2006.01)
(52) U.S. Cl. .................... 324/207.24; 345/161
(58) Field of Classification Search ............. 74/473.12, 74/473.18; 701/52, 53; 324/207.24, 207.25
See application file for complete search history.

(56) References Cited

U.S. PATENT DOCUMENTS

| | | | | |
|---|---|---|---|---|
| 4,598,374 A | * | 7/1986 | Klatt | 701/60 |
| 4,668,913 A | * | 5/1987 | Vinal | 324/235 |
| 5,680,409 A | * | 10/1997 | Qin et al. | 714/799 |
| 5,831,596 A | * | 11/1998 | Marshall et al. | 345/161 |
| RE39,032 E | * | 3/2006 | Gonring et al. | 440/87 |
| 7,081,812 B2 | * | 7/2006 | Hastings, Sr. | 340/456 |
| 7,104,152 B2 | * | 9/2006 | Levin et al. | 74/471 XY |
| 7,107,868 B2 | * | 9/2006 | Yone | 74/335 |
| 7,137,475 B2 | * | 11/2006 | Shiomi et al. | 180/315 |
| 7,421,923 B2 | * | 9/2008 | Kim | 74/473.12 |
| 7,552,615 B2 | * | 6/2009 | Kuwata et al. | 73/1.75 |
| 2003/0213327 A1 | * | 11/2003 | Syamoto | 74/473.12 |
| 2006/0207310 A1 | * | 9/2006 | Kuwata et al. | 73/1.37 |
| 2007/0137337 A1 | * | 6/2007 | Kim | 74/335 |

* cited by examiner

*Primary Examiner* — Melissa Koval
*Assistant Examiner* — Temilade S Rhodes-Vivour
(74) *Attorney, Agent, or Firm* — Lionel D. Anderson; Reising Ethington P.C.

(57) ABSTRACT

A position sensor arrangement and method for determining the position of a movable device, such as an electronic gear shifter for vehicle. According to one embodiment, the position sensor arrangement is arranged in a skewed or offset fashion, with respect to the shifting pattern of the electronic gear shifter, such that movement of the gear shifter from one discrete position to an adjacent discrete position causes a change in both an x-axis coordinate and a y-axis coordinate.

18 Claims, 4 Drawing Sheets

POSITION SENSOR ARRANGEMENT AND METHOD

REFERENCE TO RELATED APPLICATIONS

This application claims the benefit of U.S. Provisional Ser. No. 61/026,818 filed on Feb. 7, 2008.

TECHNICAL FIELD

The present invention generally relates to position sensors and, more particularly, to a position sensor arrangement that can determine the location of a movable device, such as an electronic gear shifter for a vehicle.

BACKGROUND

Position sensing arrangements, including those used with electronic gear shifters for vehicles, may require multiple sensors for purposes of redundancy and reliability. Providing redundant sensing elements can increase the robustness of the position sensing arrangement and enable the arrangement to function even with a sensor malfunction. However, position sensor multiplicity and redundancy generally increases the cost and complexity of the system.

SUMMARY OF THE INVENTION

According to one embodiment, there is provide a position sensor arrangement that comprises: one or more first position sensor(s) for sensing the position of a movable device relative to a first axis; and one or more second position sensor(s) for sensing the position of the movable device relative to a second axis. The movable device moves according to a path that includes a plurality of discrete positions and a plurality of intermediate segments, and the position sensor arrangement is offset with respect to the path.

According to another embodiment, there is provided a position sensor arrangement that comprises: a plurality of first position sensors for sensing a first position coordinate for an electronic gear shifter in a vehicle; a plurality of second position sensors for sensing a second position coordinate for the electronic gear shifter; and an electronic processing device coupled to the pluralities of first and second position sensors for receiving the first and second position coordinates. Movement by the electronic gear shifter between adjacent discrete positions causes a change in both the first position coordinate and the second position coordinate.

According to another embodiment, there is provided a method for sensing the position of an electronic gear shifter in a vehicle. The method generally comprises the steps of: (a) taking a first position reading of the electronic gear shifter with one or more first position sensor(s); (b) taking a second position reading of the electronic gear shifter with one or more second position sensor(s), wherein the first and second position sensors are part of a position sensor arrangement that is skewed with respect to a shifting pattern of the electronic gear shifter; and (c) using the first and second position readings to determine the correct position of the electronic gear shifter.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The position sensor arrangement and method described herein can be used to determine the position of a variety of movable devices including, but not limited to, electronic gear shifters for vehicles.

Although, the following description is directed to several exemplary electronic gear shifters, it should be appreciated that the present position sensor arrangement and method could be used with other applications as well. For example, they could alternatively be used with gear shifters that: have different shift patterns, have more than two axes of movement, are mounted in different locations within the vehicle, or are used with manual transmissions, to name but a few possibilities. Furthermore, it is possible to utilize the present position sensor arrangement and method with devices other than gear shifters.

Figure 1:
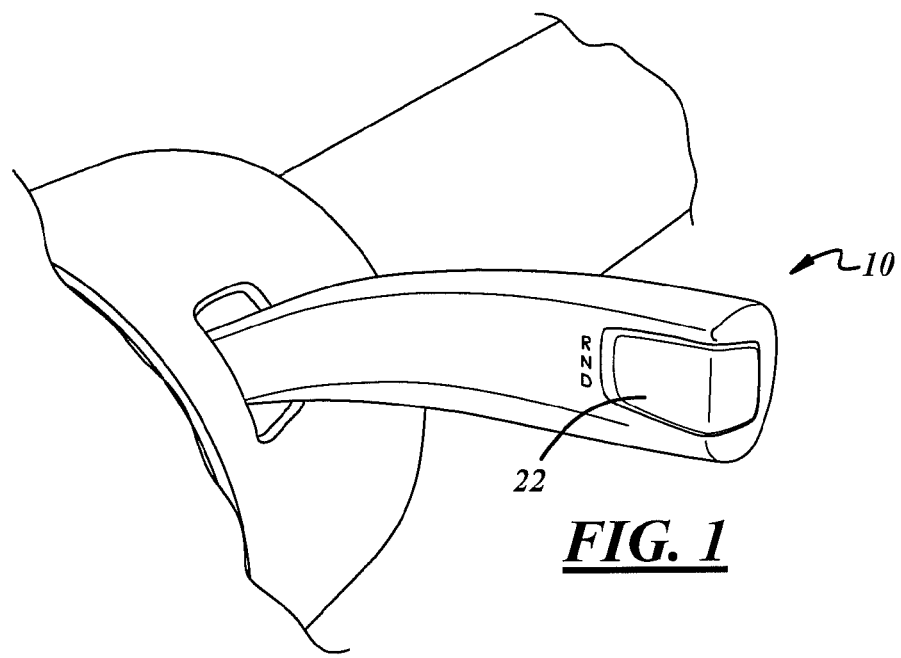
FIG. 1 is a perspective view of an exemplary electronic gear shifter that is mounted to a steering column of a vehicle.
Figure 3:
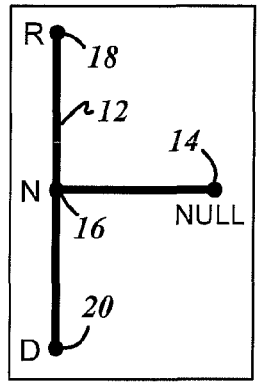
FIG. 3 is an illustration of an exemplary four-position shift pattern that can be used with the electronic gear shifter of FIG. 1.

With reference to FIG. 1, there is shown a perspective view of an exemplary electronic gear shifter 10 that is mounted to a vehicle steering column and is used to select different gears of an automatic transmission. In this particular case, electronic gear shifter 10 enables a driver to select between reverse (R), neutral (N) and drive (D) gears by moving the electronic gear shifter up and down. When the driver disengages or lets go of electronic gear shifter 10, it returns to a null or rest position. As best illustrated in FIG. 3, electronic gear shifter 10 generally follows a four-position shift pattern 12 where the null position 14 can only be accessed from the middle of the shift pattern (i.e., the driver must shift from neutral 16 to the null position, they cannot shift directly from reverse 18 or drive 20 to the null position). Again, the four-position shift pattern shown here is only one example of an application that could utilize the present position sensor arrangement and method, as they could be used with other applications as well. The exemplary transmission options (R, N, D) are only some of the basic options; additional transmission features like paddle shifters, economy modes, towing modes, etc. could be added to the shift pattern or to other suitable locations in the vehicle, such as a steering wheel, control stalk, or dashboard, for example. A separate button 22 for putting the vehicle in park is shown on electronic gear shifter 10.

Figure 2:
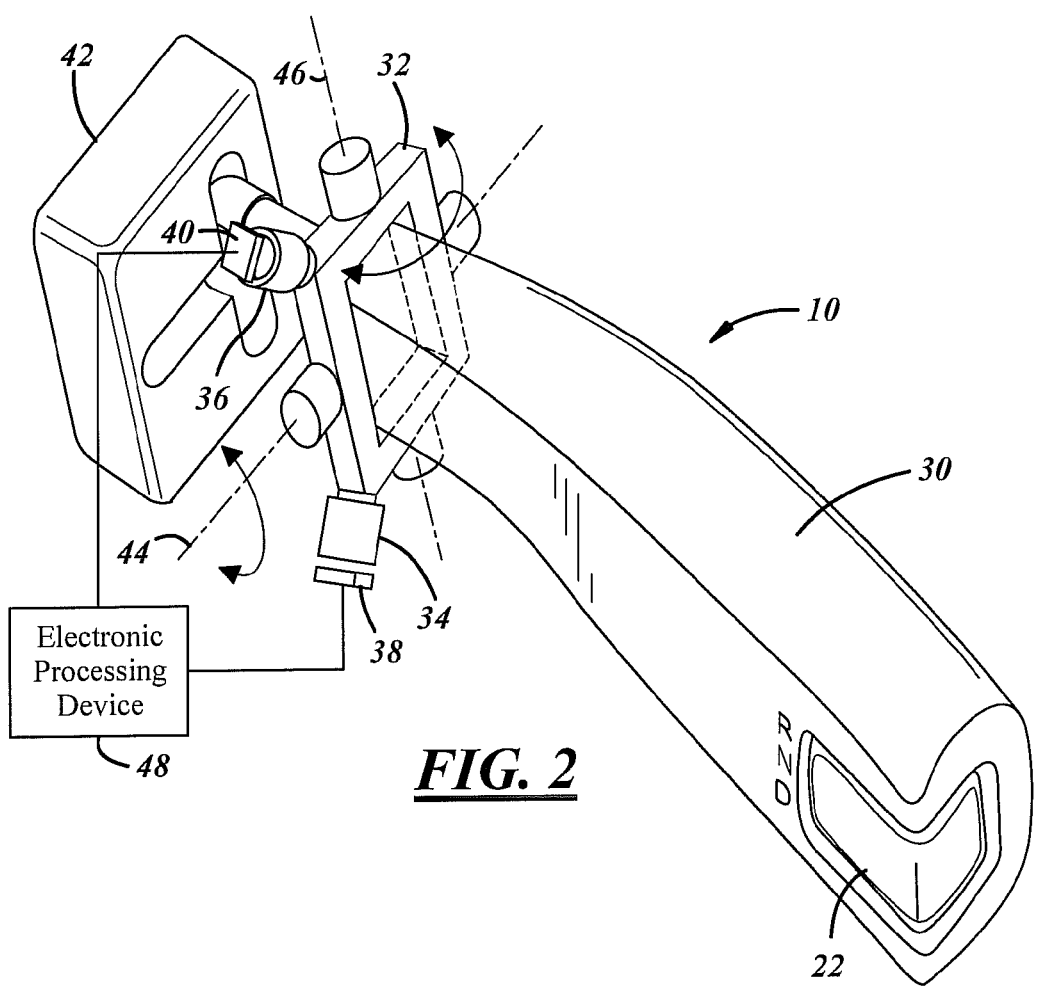
FIG. 2 is a perspective view of the electronic gear shifter of FIG. 1, with some of the components removed to illustrate certain features.

FIG. 2 shows a perspective view of electronic gear shifter 10, including an example of how the present position sensor arrangement can be implemented within an exemplary electronic gear shifter. In this particular embodiment, electronic gear shifter 10 generally includes a control arm 30, a mounting component 32, magnetic elements 34, 36, position sensors 38, 40, a groove plate 42, and an electronic processing device 48. Control arm 30 is a generally elongated lever or stalk that extends from a steering column and provides the driver with the ability to cycle through transmission options R, N and D. Control arm 30 is spring-loaded or otherwise biased so that when the driver is done selecting transmission options, the control arm returns to the null position via shift pattern 12. This shift pattern is machined or otherwise formed on a surface of groove plate 42 so that an end of control arm 30 can move within the grooves and follow the shift pattern when the electronic gear shifter is engaged. Mounting component 32 is fixedly attached to control arm 30 and provides for control arm movement in two axes 44, 46.

Mounting component 32 carries magnetic elements 34, 36 so that movement of control arm 30 causes a corresponding movement of the magnetic elements. This movement, in turn, affects an electromagnetic field which is sensed by position sensors 38, 40 and is used to determine the position of control arm 30. According to this particular embodiment, position sensor 38 is a magnetic sensor that determines the control arm's position (R, N, D) by sensing rotation about axis 44, proximity with magnetic element 34, or some combination thereof. Position sensor 40 is also a magnetic position sensor and determines the position (N, NULL) of control arm 30 by sensing rotation about axis 46, distance to magnetic element 36, or some combination thereof. Of course, other sensor types and mounting configurations could also be used, as the exemplary embodiment shown in FIG. 2 is simply meant to illustrate the offset nature of the position sensor arrangement. Output from position sensors 38, 40 can be sent to electronic processing device 48 for further signal processing and analysis. Depending on the particular application, the electronic processing device can be an analog or digital device, it can be a dedicated processing device, or it can be shared by a number of components and be part of a larger system like a vehicle electronic module, to cite several possibilities.

As will be subsequently explained in greater detail, the position sensor arrangement should be arranged in a skewed or offset fashion, with respect to shift pattern 12. Furthermore, it should be appreciated that multiple position sensors could be used with each axis to provide redundancy and greater system robustness. For example, additional position sensors could be installed on the opposite corners of mounting component 32 from position sensors 38, 40 to redundantly sense movement of the electronic gear shifter. Additional position sensors do not have to be mounted across from each other and on opposite corners of exemplary mounting component 32; instead, they could be mounted adjacent position sensors 38, 40 (they could even be integrated into a single package or module) or at some other suitable location that enables them to sense the position of control arm 30.

Figure 4:
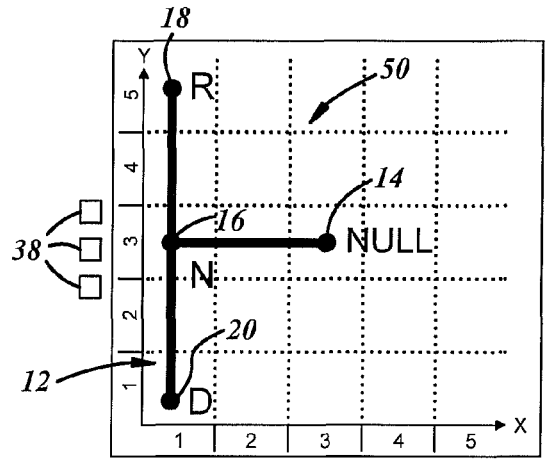
FIG. 4 is an illustration of a conventional position sensor arrangement being used with the four-position shift pattern of FIG. 3.

Turning now to FIG. 4, there is shown a conventional position sensor arrangement 50 used with the four-position shift pattern 12 previously described. According to this example, conventional position sensor arrangement 50 uses three position sensors to redundantly determine the x-axis position of an electronic gear shifter (schematically illustrated as sensors 40), and three position sensors to redundantly determine its y-axis position (sensors 38). Because of the nature of electronic gear shifters, sensor multiplicity or redundancy is oftentimes a requirement. To illustrate, assume that only a single y-axis position sensor 38 is used and that the sensor has a malfunction which causes it to provide an inaccurate y-axis position. Not only would the system be unable to accurately identify the gear shifter position, it may not be aware that an error has occurred. Assume now that conventional position sensor arrangement 50 utilizes two position sensors per axis and that there is a malfunction with, for example, one of the y-axis sensors 38. The system would be alerted that there is an error because the two y-axis sensors 38 are providing different output, however, the system may not be able to determine which sensor has malfunctioned. This explains why some conventional position sensor arrangements, such as the one shown in FIG. 4, use three position sensors per axis. Such systems can employ a 'two-of-three' voting strategy that not only detects a sensor malfunction, but also identifies which sensor is bad.

Figure 5:
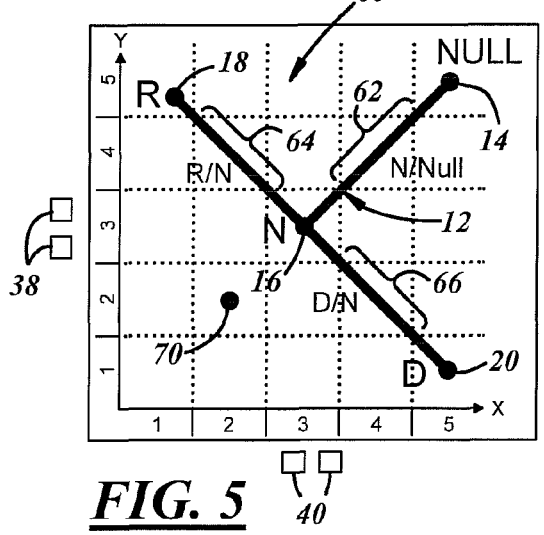
FIG. 5 is an embodiment of the present position sensor arrangement being used with the four-position shift pattern of FIG. 3.

With reference to FIG. 5, there is shown an embodiment of the present position sensor arrangement 60 being used with the four-position shift pattern 12 previously described. It should be noted, the shift pattern in FIG. 5 also includes several intermediate shifter segments, where the gear shifter is in-between discrete shifter positions R, N, D, NULL. For example, shift pattern 12 can include a null/neutral segment 62, a reverse/neutral segment 64, and a drive/neutral segment 66. There are instances when it can be beneficial for knowing if the gear shifter is in one of these intermediate shifter segments, as is appreciated by those skilled in the art.

According to this particular embodiment, position sensor arrangement 60 has two position sensors 40 for sensing gear shifter position about axis 46, two position sensors 38 for sensing gear shifter position about axis 44, and is oriented so that it is skewed or offset with respect to shift pattern 12. Stated differently, the four-position shift pattern 12 includes paths of travel that are diagonally or obliquely arranged with respect to position sensor arrangement 60, so that shifting between transmission options R, N, D, NULL causes changes in both the x- and y-axis position coordinates. In FIG. 5, shift pattern 12 is illustrated in a diagonal orientation and position sensor arrangement 60 is shown in a non-diagonal or level orientation. However, people skilled in the art will appreciate that it does not matter whether the present position sensor arrangement and/or the shift pattern are diagonally arranged, so long as the two are skewed or offset with respect to one another. This skewed or offset arrangement can result in a number of desirable attributes, including improved reliability, robustness and redundancy, as well as reduced cost, weight and part count (e.g., conventional sensor arrangement 50 uses a total of six position sensors, while the present sensor arrangement uses only four). It is not necessary that every portion or segment of the shift pattern be aligned offset with respect to the position sensor arrangement, as the arrangement and method described herein could be adapted for use in these settings as well. These and other features will become apparent through the following illustrative examples.

Consider the example where electronic gear shifter 10 is in a reverse position 18, and one of the two sensors 40 malfunctions and erroneously reports an x-axis position coordinate of '3' instead of the correct coordinate of '1'. The sensed coordinates would be '3' and '1' for the x-axis and '5' and '5' for the y-axis (coordinates will hereinafter be reported in the form (x, x), (y, y) for the four sensors). Because the y-axis coordinates are the same, the present method assumes that position sensors 38 are operating properly (low likelihood that both sensors 38 have malfunctioned and have reported the same erroneous output). The sensor malfunction described above is detected because the two sensors 40 are reporting different values. With reference to FIG. 5, there are only two acceptable x-axis coordinates when the y-axis coordinate equals '5', and they are '1' and '5'. Thus, the present method determines that the x-axis sensor providing the output '1' is functioning properly and the one providing the output '3' is malfunctioning.

There are some situations where a sensor malfunctions and cannot be identified solely with its output. For instance, consider the example above but assume that the malfunctioning sensor 40 provides an erroneous x-axis coordinate of '5' instead of '3'. The coordinates (5, 5) correspond to null position 14, which is a legitimate position for electronic gear shifter 10. These scenarios, while rare, can occur and are referred to herein as 'ambiguous states'. In the example above where the sensed coordinates were (1, 3), (5, 5), the present method is not only able to detect a sensor malfunction, it can also diagnose which sensor has malfunctioned and still accurately determine the correct position of electronic gear shifter 10. This enables continuing use of the gear shifter with a single sensor malfunction. In the current example where the coordinates were (1, 5), (5, 5)—i.e., an ambiguous state—the present method is able to detect a sensor malfunction, but uses additional features or techniques to determine the true position of electronic gear shifter 10 and to determine which sensor is bad.

One such technique involves referring to the previous and/or next position sensed by position sensor arrangement 60, and using that unambiguous state to identify the malfunctioning sensor and to determine the correct position of electronic gear shifter 10. For example, in the ambiguous state (1, 5), (5, 5) mentioned above, a log of previously recorded positions could be used to resolve this ambiguity. If the last set of coordinates saved were (2, 5), (4, 4) (which still reflects a single malfunctioning x-axis sensor, but is representative of an 'unambiguous state'), the present method can infer that the gear shifter was last in intermediate segment 64, which is located between neutral and reverse. With this information, it is clear that the x-axis sensor that is providing the '5' output is the malfunctioning sensor, and that the ambiguous state (1, 5), (5, 5) really corresponds to the reverse position 18. Instead of referring backwards in time to the previously saved coordinates, it is also possible to resolve the ambiguous state by looking forward to the next set of registered coordinates. For instance, any transition from the ambiguous state to an unambiguous state could be used by the present method to identify the faulty sensor and determine the electronic gear shifter's true location. It is possible, although rare, for electronic gear shifter 10 to transition from an ambiguous state to another ambiguous state. Considering that certain transitions are implausible (e.g., shifting directly from the reverse position 18 to the null position 14 without first going through the neutral position 16), the number of ambiguous-to-ambiguous transitions is reduced even further.

Consider a different example where electronic gear shifter 10 has experienced some type of mechanical failure, such as the case where it has become physically decoupled and comes to rest in an unauthorized position outside of shift pattern 12; e.g., a position 70 corresponding to coordinates (2, 2), (2, 2). The present method can detect such a mechanical failure. First, the present method assumes that there are no sensor failures because both of the sensors 40 and both of the sensors 38 are providing the same respective output; i.e., they are corroborating each other. Second, the present method is aware that position 70 is an unauthorized position located outside of the shift pattern. In view of the seemingly accurate position sensor information and the unauthorized position, the present method can determine that a mechanical failure has occurred and appropriate steps can be taken to warn the driver, etc.

In some embodiments, it can be beneficial for each discrete shifter position to simultaneously have unique x- and y-axis coordinates. For example, if shifter pattern 12 were modified so that the null position 14 was located at coordinates (4, 4), then each of the discrete shifter positions R, N, D, NULL in FIG. 5 would have unique x- and y-axis coordinates. This type of arrangement can be desirable in that it eliminates some of the ambiguities mentioned above, however, there can be drawbacks such as a shortened shifter stroke. As is appreciated by skilled artisans, a shortened shifter stroke or shifter travel between positions can result in a decrease in position sensing accuracy, unless offset by higher resolution sensors, etc., which can increase costs.

Figure 6:
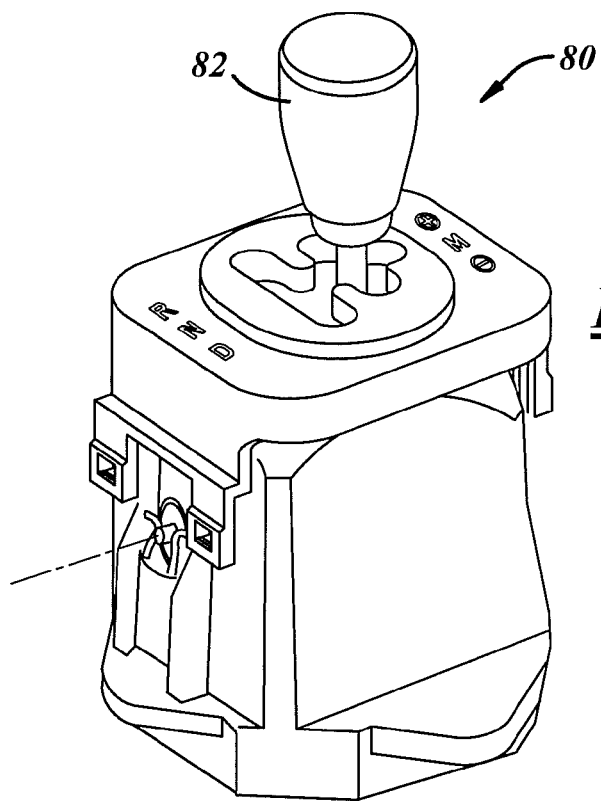
FIG. 6 is a perspective view of an exemplary electronic gear shifter that is mounted to the floor of a vehicle.
Figure 7:
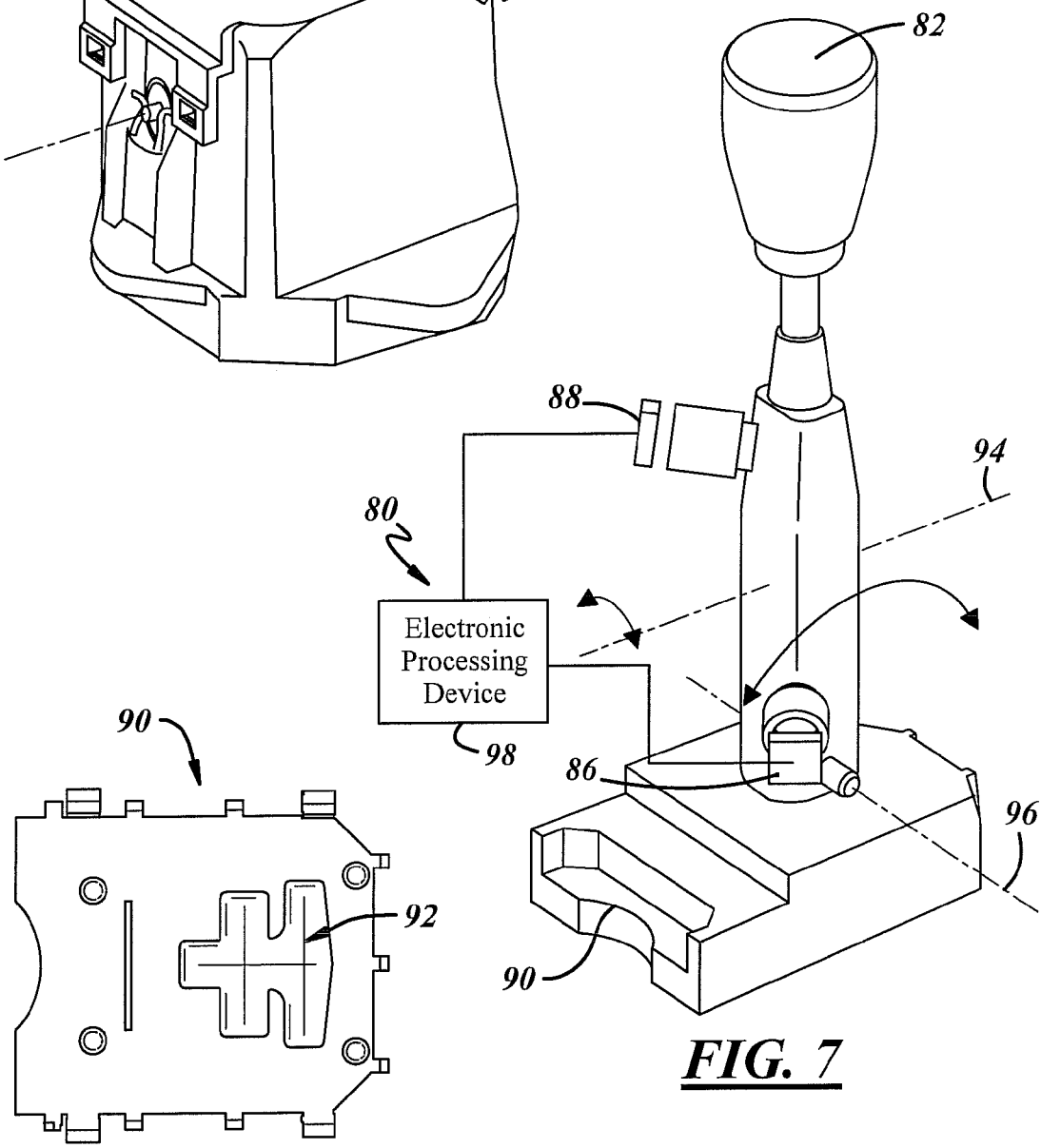
FIG. 7 is a perspective view of the electronic gear shifter of FIG. 6, with some of the components removed to illustrate certain features.
Figure 8:
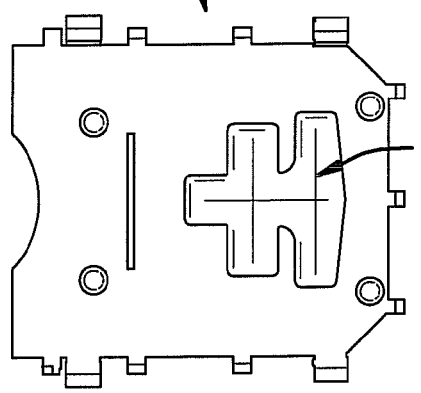
FIG. 8 is a plan view of a groove plate that has an exemplary six-position shift pattern and is part of the electronic gear shifter of FIG. 6.

Turning now to FIGS. 6 and 7, there is shown another exemplary electronic gear shifter 80 that can be used with the position sensor arrangement and method described herein. According to this particular embodiment, electronic gear shifter 80 is a floor-mounted shifter that is located between the driver and passenger seats and generally includes a control arm 82, a first position sensor 86, a second position sensor 88, and a groove plate 90. Control arm 82 includes an upper end that is fitted with a joystick-type handle for engagement by the driver, and a lower end that engages channels in groove plate 90 so that movement of the control arm is limited to the shift pattern carved in the groove plate. It should, of course, be appreciated that there are numerous potential ways to mechanically couple a control arm within a gear shifter assembly, the exemplary embodiment shown here being just one of them.

First position sensor 86 is mounted near the bottom of control arm 82 and is used to sense movement in the control arm. One example of a suitable type of position sensor that could be used is a rotational position sensor, such as the MLX91204 sold by Melexis. Position sensor 86 can include two or more position sensors integrated into a single package, a design that is ideally suited for use with embodiments of the present position sensor arrangement that use two sensors per axis. Because sensor modules having two integrated position sensors are commonly used in a wide variety of applications, not just electronic gear shifters, they can oftentimes be purchased for relatively low costs. Thus, the present two-sensor-per-axis arrangement can reduce costs by lending itself to more off-the-shelf-type components.

Second position sensor 88 is mounted above sensor 86 and also determines the position of the control arm. In this particular embodiment, position sensor 88 includes a proximity sensor that senses the linear distance to a magnet or other element attached to control arm 82, which moves away from and towards the sensor when transitioning between the N, null, and M positions, for example. This to and fro movement can be translated into a position reading which can then be used to determine the position of electronic gear shifter 80. It should be recognized that any combination of rotational, angular, linear, proximity, magnetic, non-magnetic, and/or other sensors known in the art could be used for position sensors 86, 88. Output from position sensors 86, 88 can be sent to electronic processing device 98 for signal processing and analysis. The electronic processing device can execute a variety of electronic instructions, including those of the present method, in order to interpret and analyze the sensor readings and determine the position of gear shifter 80. Of course, additional position sensors could be added or different position sensing arrangements could be used, as the preceding example is only meant to illustrate one exemplary implementation of the present position sensor arrangement and method.

Figure 9:
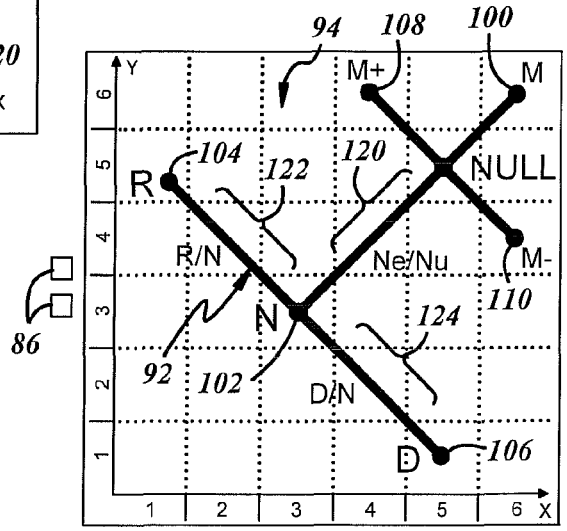
FIG. 9 is an embodiment of the present position sensor arrangement being used with the six-position shift pattern of FIG. 8.

As best shown in FIG. 9, the first and second position sensors 86, 88 should be obliquely or diagonally aligned with respect to the six-position shift pattern 92. This particular shift pattern 92 is generally arranged at a 45° angle with position sensor arrangement 94, and includes a manual position 100, a neutral position 102, a reverse position 104, a drive position 106, a manual shift-up position 108, and a manual shift-down position 110. First and second position sensors 86, 88 are illustratively shown here using a six-by-six grid to determine the location of electronic gear shifter 80. As previously stated, by having the position sensor arrangement and shift pattern aligned in a skewed or offset manner, transitioning electronic gear shifter 80 between the various shifter positions results in changes to both the x- and y-axis coordinates.

Consider the example where electronic gear shifter 80 is in the manual position 100 when one of the two sensors 86 goes bad. Instead of providing the correct output (6, 6), (6, 6), the position sensor arrangement outputs the coordinates (6, 6), (6, 5), for example, which corresponds to an unambiguous state. The present method can check for all y-axis possibilities when the x-axis coordinate equals '6' (sensors 88 are assumed to be functioning properly because they are outputting the same result). In this case, the present method is able to identify the malfunctioning sensor 86—it is the one outputting a '5' because (6, 5) does not correspond to an acceptable shifter position. Again, there are certain scenarios where one of the position sensors malfunctions and an ambiguous state arises. For more information, please refer to the previous description regarding exemplary methods for addressing ambiguous states. Intermediate shifter segments can also be detected in shift pattern 92; these can include a null/neutral segment 120, a reverse/neutral segment 122, and a drive/neutral segment 124.

Figure 10:
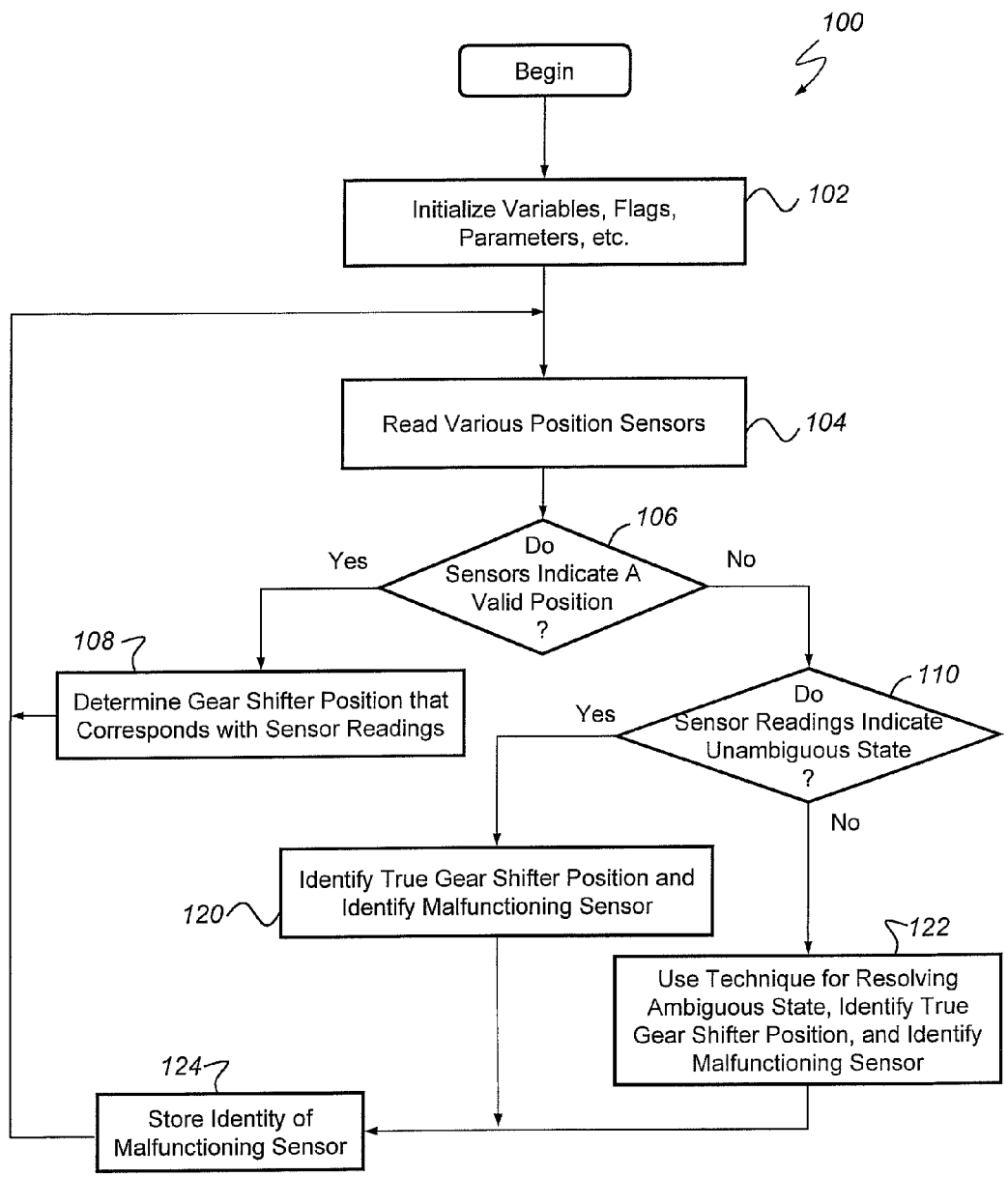
FIG. 10 is a flowchart outlining some of the steps of an embodiment of the present method.

With reference to FIG. 10, there is shown a flowchart outlining some of the steps of an exemplary embodiment 100 of the present method. In a first step 102, the method initializes several variables, flags, parameters, etc. In this particular embodiment, step 102 sets a Shifter_Position variable to 'NULL', a Diagnostic_State flag to 'NO MALFUNCTION', and a Malfunctioning_Sensor variable to 'NONE'. Other settings and initializations could also be performed.

Next, step 104 reads the various position sensors (x1, x2, y1, y2) and processes this input in one of a variety of ways. For example, the readings from each of the position sensors could be sent to an electronic processing device and broken into zones—e.g., five x-axis zones in FIG. 5, six x-axis zones in FIG. 9, etc. Step 106 then checks the validity of the position sensor readings to determine if they are all functioning properly. One way to determine this is to check to make sure that both x1 and x1 sensors are outputting the same x-axis coordinate, and that both y1 and y2 sensors are outputting the same y-axis coordinate. If the reported x-axis and y-axis coordinates are consistent with one another, then step 106 may also check to see that they correspond to a valid electronic gear shifter position. As mentioned above, if the electronic gear shifter were to suffer a mechanical malfunction and deviate from the shifter pattern, for example, then it is possible for the coordinates to be consistent with one another yet correspond to an invalid position. Step 106 could perform other checks as well.

If step 106 determines that all of the sensors are properly working and are conveying a valid electronic gear shifter position, then step 108 can use a look-up table or other suitable means to find out which shifter position corresponds to the sensor readings. This position can be written into the variable Shifter Position and the Diagnostic_State flag can be maintained at No_Malfunction.

If step 106 determines that one or more position sensors are malfunctioning, then step 110 may establish whether or not an 'unambiguous state' is present, as already explained. If the sensor malfunction results in an unambiguous state, then step 120 is able to determine both the true position of the gear shifter (Shifter_Position), and the identity of the malfunctioning sensor (Sensor_Failed). If step 110 determines that the position sensor arrangement is in an ambiguous state, then method 100 temporarily assumes that the gear shifter is in a default position like the NULL position (Shifter_Position=NULL) and uses one or more techniques for resolving this ambiguity. Several examples of such techniques were previously given, including reviewing the previous and/or the next unambiguous state and using this information to identify the malfunctioning sensor, step 122. The identity of the flawed or malfunctioning position sensor can be stored, step 124, for subsequent diagnosis or analysis before the method returns to step 104. This general sequence of steps can continue until the ignition is turned off or some other event occurs, for example.

It should be appreciated that the preceding description is just one exemplary embodiment of the present position sensor arrangement. For instance, the position sensor arrangement does not have to have two position sensors per axis (e.g., it could use one, three, four, five, etc. position sensors per axis); it does not have to use rotational position sensors only, as any combination of rotational, angular, linear, proximity, magnetic, non-magnetic, and/or other sensor types could be employed; it does not have to use a five-by-five or six-by-six grid, instead the shift pattern could be broken up into more or less zones; it does not have to use the illustrative sensor mounting configurations shown, as practical manufacturing and design considerations could dictate other configurations; and it does not have to utilize a grid with x- and y-axis coordinates, as other coordinate systems and techniques for measuring position relative to an axis or degree of freedom could also be used, for example. These are, of course, only some of the possibilities, as others that become apparent to those skilled in the art could be used as well.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "e.g.," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items.

Other terms are to be construed using their broadest reasonable meaning unless they are used in a context that requires a different interpretation.

The invention claimed is:

1. A position sensor arrangement, comprising:
   one or more first position sensor(s) providing output regarding the position of a movable device relative to a first axis; and
   one or more second position sensor(s) providing output regarding the position of the movable device relative to a second axis, the output from both the first and second position sensor(s) is used to determine the overall position of the movable device;
   wherein the movable device moves according to a path that includes a plurality of valid positions and a plurality of intermediate segments located between the valid positions, and the position sensor arrangement is aligned in an orientation that it is skewed with respect to the movable device path.

2. The position sensor arrangement of claim 1, wherein the position sensor arrangement is mounted near an electronic gear shifter in a vehicle so that the first position sensor(s) determine a first position coordinate for the electronic gear shifter, and the second position sensor(s) determine a second position coordinate for the electronic gear shifter.

3. The position sensor arrangement of claim 2, wherein the electronic gear shifter includes a mounting component that enables it to move about the first and second axes, and the position sensor arrangement includes a first magnetic element attached to the mounting component near the first position sensor(s) and a second magnetic element attached to the mounting component near the second position sensor(s), wherein movement of the electronic gear shifter causes the first and second position sensor(s) to detect displacements by the first and second magnetic elements, respectively.

4. The position sensor arrangement of claim 2, wherein the position sensor arrangement includes a total of four position sensors, two first position sensors for sensing the position of the electronic gear shifter relative to the first axis and two second position sensors for sensing the position of the electronic gear shifter relative to the second axis.

5. The position sensor arrangement of claim 4, wherein the position sensor arrangement detects a position sensor error and identifies the malfunctioning position sensor with only a total of four position sensors.

6. The position sensor arrangement of claim 2, wherein movement by the electronic gear shifter from one valid position to an adjacent valid position causes a change in both the first position coordinate and the second position coordinate.

7. The position sensor arrangement of claim 2, wherein each valid position for the electronic gear shifter has a unique first position coordinate and a unique second position coordinate.

8. The position sensor arrangement of claim 2, wherein an error in one of the first or second position sensors results in either an unambiguous or an ambiguous state for the electronic gear shifter, and the position sensor arrangement uses unambiguous states to resolve ambiguous states.

9. The position sensor arrangement of claim 2, wherein the position sensor arrangement is skewed with respect to the electronic gear shifter path by approximately 45°.

10. A position sensor arrangement, comprising:
    a plurality of first position sensors for sensing a first position coordinate for an electronic gear shifter in a vehicle;
    a plurality of second position sensors for sensing a second position coordinate for the electronic gear shifter; and
    an electronic processing device coupled to the pluralities of first and second position sensors for receiving the first and second position coordinates, wherein movement by the electronic gear shifter from a valid position to an adjacent valid position causes a change in both the first position coordinate and the second position coordinate and, when a position sensor malfunction occurs, the electronic processing device uses the change in the first and second position coordinates to both detect the position sensor malfunction and to identify the malfunctioning position sensor.

11. A method for sensing the position of an electronic gear shifter in a vehicle, comprising the steps of:
    (a) taking a first position reading of the electronic gear shifter with one or more first position sensor(s);
    (b) taking a second position reading of the electronic gear shifter with one or more second position sensor(s), wherein the first and second position sensors are part of a position sensor arrangement that is skewed with respect to a shifting pattern of the electronic gear shifter so that the shifting pattern includes paths of travel that are diagonally or obliquely aligned with respect to the position sensor arrangement; and
    (c) using the first and second position readings to determine the correct position of the electronic gear shifter even when one or more of the first or second position sensors is malfunctioning.

12. The method of claim 11, wherein step (a) further comprises taking a first position reading of the electronic gear shifter with only two first position sensor(s); and step (b) further comprises taking a second position reading of the electronic gear shifter with only two second position sensor(s).

13. The method of claim 12, wherein step (c) further comprises detecting if there is a position sensor error and identifying the malfunctioning position sensor with only a total of four position sensors.

14. The method of claim 11, wherein step (c) further comprises detecting an ambiguous state and referring to an unambiguous state in order to determine the correct position of the electronic gear shifter.

15. The method of claim 14, wherein the unambiguous state refers to the previous position sensed by the position sensor arrangement.

16. The method of claim 14, wherein the unambiguous state refers to the next position sensed by the position sensor arrangement.

17. The method of claim 14, wherein the unambiguous state refers to an intermediate segment that is located between discrete positions of the shifting pattern.

18. The method of claim 11, further comprising the step of:
    (d) detecting a position sensor malfunction and identifying the malfunctioning position sensor.

* * * * *